United States Patent [19]
Knappe et al.

[11] Patent Number: 4,483,360
[45] Date of Patent: Nov. 20, 1984

[54] ACTUATOR MECHANISM FOR DOUBLE-BLOCK AND VENT VALVE

[75] Inventors: Herman E. Knappe, Cedar Rapids; James W. Scott, Marion, both of Iowa

[73] Assignee: Cherry-Burrell Corporation, Cedar Rapids, Iowa

[21] Appl. No.: 473,988

[22] Filed: Mar. 10, 1983

[51] Int. Cl.³ .................. B08B 9/02; F16K 31/122
[52] U.S. Cl. .................. 137/240; 137/312; 137/614.17; 137/614.18; 137/637.2; 134/166 C; 251/94; 251/95
[58] Field of Search .......... 137/237, 238, 240, 241, 137/312, 614.16, 614.17, 614.18, 614.19, 637.2; 134/166 C; 251/94, 95, 116

[56] References Cited

U.S. PATENT DOCUMENTS

| 4,304,251 | 12/1981 | Schädel et al. | 137/240 |
|---|---|---|---|
| 4,344,453 | 8/1982 | Tuchenhagen et al. | 137/240 |
| 4,368,753 | 1/1983 | Brakelmann et al. | 137/240 |
| 4,373,545 | 2/1983 | Knappe | 137/240 |
| 4,436,106 | 3/1984 | Tuchenhagen et al. | 137/240 |

FOREIGN PATENT DOCUMENTS

| 2532838 | 1/1977 | Fed. Rep. of Germany. | |
|---|---|---|---|
| 1592732 | 7/1981 | United Kingdom. | |
| 1592733 | 7/1981 | United Kingdom. | |
| 2076116 | 11/1981 | United Kingdom | 137/240 |

Primary Examiner—George L. Walton
Attorney, Agent, or Firm—Fitch, Even, Tabin & Flannery

[57] ABSTRACT

A double-block and vent valve having an improved actuator mechanism to allow one part of a composite valve member to be lifted separately from another. The actuator mechanism overlies the valve housing and is connected to the two valve member parts via coaxial rod and tube members. Hold-down cams normally block the upward movement of the tube member to positively lock the upper valve member part against its seat when it is desired to lift only the lower valve member part. A pair of pivotal cams are spring-biased to this blocking position where they bear against lug means carried by the tube member. A small, horizontal, fluid-actuated cylinder pivots the hold-down cams to a non-interfering position whenever it is desired to lift only the upper valve member part or to lift the composite valve member.

13 Claims, 8 Drawing Figures

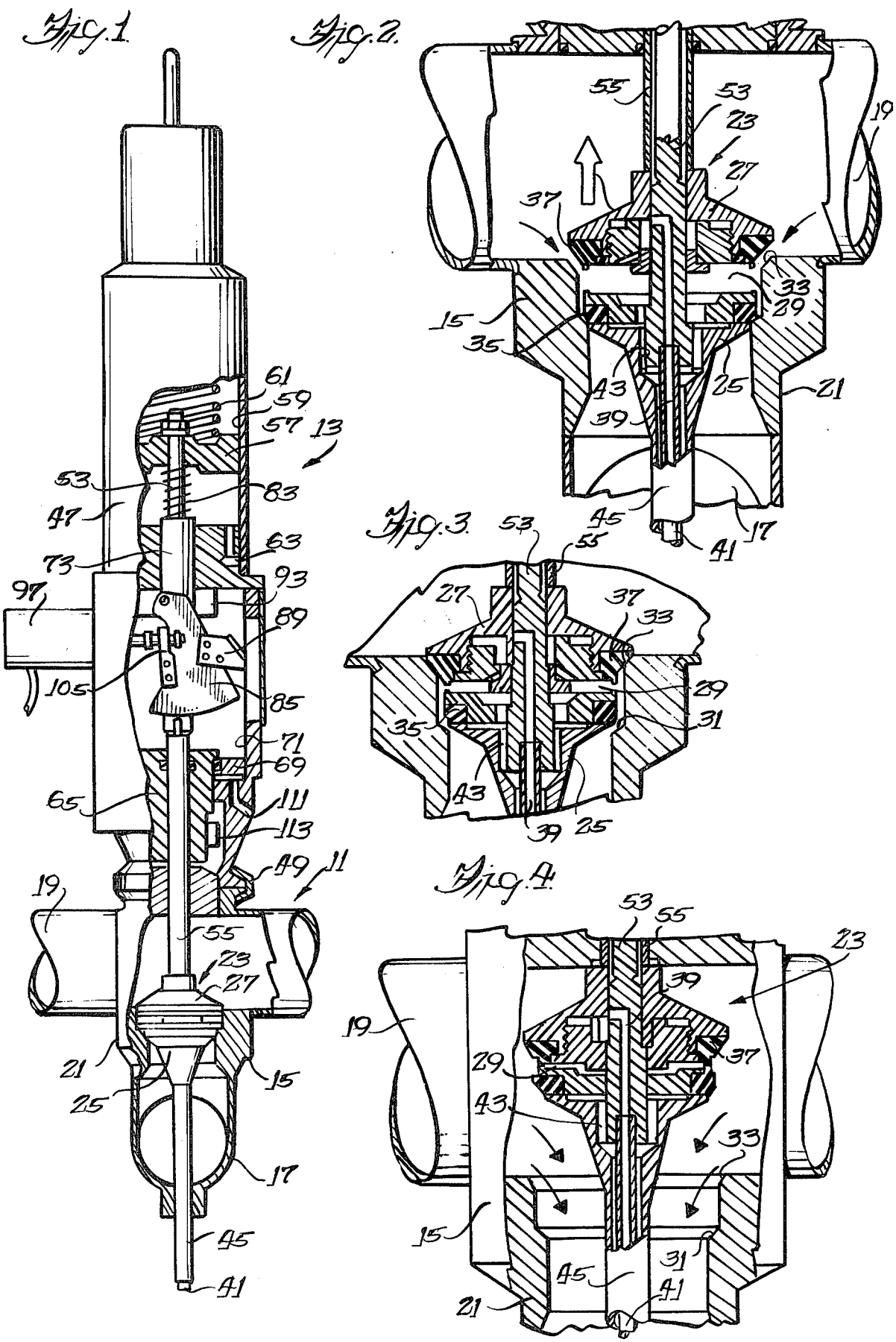

ACTUATOR MECHANISM FOR DOUBLE-BLOCK AND VENT VALVE

The present invention relates to valves for controlling the flow of liquids in lines between separate piping systems and more particularly to actuator mechanisms for valves of this type which may be cleaned in place.

BACKGROUND OF THE INVENTION

Industries which produce large amounts of liquid products, such as the brewing, soft drink, dairy and other food-oriented industries, utilize large networks of pipes to transfer liquid from one location to another. For a variety of reasons, it is necessary to periodically switch the pathways of liquid flow through the piping network, and accordingly a large number of switching valves may be included as a part of an overall array where the flow from any one of a number of product supply lines can be routed to a desired product outlet line. For example, a modern brewing facility may have a large number of switching valves which are automatically controlled by a central, programmable control unit.

A primary requirement in the beverage and other food industries is that cleanliness be maintained throughout the facility including, of course, the piping networks. While pipes through which liquid flows continuously are generally self-cleaning, stagnation can, of course, occur at valves which are used only periodically, and achieving cleanliness at valve locations is important.

Because it is necessary that such valves in the closed position positively block any liquid flow between the piping systems, it has become a practice in the industry to use valves having relatively movable valve member parts that provide double seats with a leakage chamber therebetween whereby liquid leaking around either seat is drained externally rather than into the other piping network. In order to clean the leakage chamber between the seats of the closed valve, double-block and vent or bleed valves have been developed which have passageways through which cleaning solutions may be supplied to wash the surfaces of the leakage chamber and exit via the drain.

Although in this manner, it is possible to clean the entire intermediate or leakage chamber within this composite valve member, there is no provision for cleaning the actual seat because the valve member parts will be seated during the anticipated in-place cleaning that takes place. Accordingly, provisions have recently been made in order to separately stroke or lift the individual valve member parts so that a particular line and valve seat can be cleaned while product may be flowing through the outer line. Examples of such valves include those shown in U.S. Pat. No. 4,304,251, issued Dec. 8, 1981, and in British patent specification No. 1,592,732 published July 8, 1981. Improvements in valves of this particular type have been sought.

SUMMARY OF THE INVENTION

A double-block and vent valve is provided having an improved actuator mechanism which allows either relatively movable part of a composite valve member to be lifted or stroked separately. The actuator mechanism is located in overlying relationship above the valve housing and is connected to the relatively movable valve member parts via coaxial rod and tube members that extend upward therefrom. The actuator mechanism is provided with hold-down means for normally blocking the upward movement of the tube member. As a result, when it is desired to lift only the lower valve member part, the upper part remains positively locked against its seat by the hold-down means.

Illustrated are a pair of pivotal cams which are spring-biased to this blocking position where they bear against lug means carried by the tube member. A small horizontal fluid-actuated cylinder is used to pivot the hold-down cam to a non-interfering position whenever it is desired to either lift the upper valve member part only or to lift both valve member parts.

BRIEF DESCRIPTION OF THE DRAWINGS

FIG. 1 is a front elevation view with portions broken away and shown in section of a valve and actuator mechanism embodying various features of the invention which is depicted in the orientation wherein it might be used in an array of such valves and which is shown with both parts of the composite valve member seated in closed position;

FIG. 2 is an enlarged fragmentary view illustrating the composite valve member with the upper valve member part lifted from its seat;

FIG. 3 is a view similar to FIG. 2 showing only the lower valve member part lifted from its seat;

FIG. 4 is a view similar to FIGS. 2 and 3 showing the composite valve member in the fully opened position allowing free flow between the two main conduits;

DETAILED DESCRIPTION OF THE PREFERRED EMBODIMENTS

Figure 5:
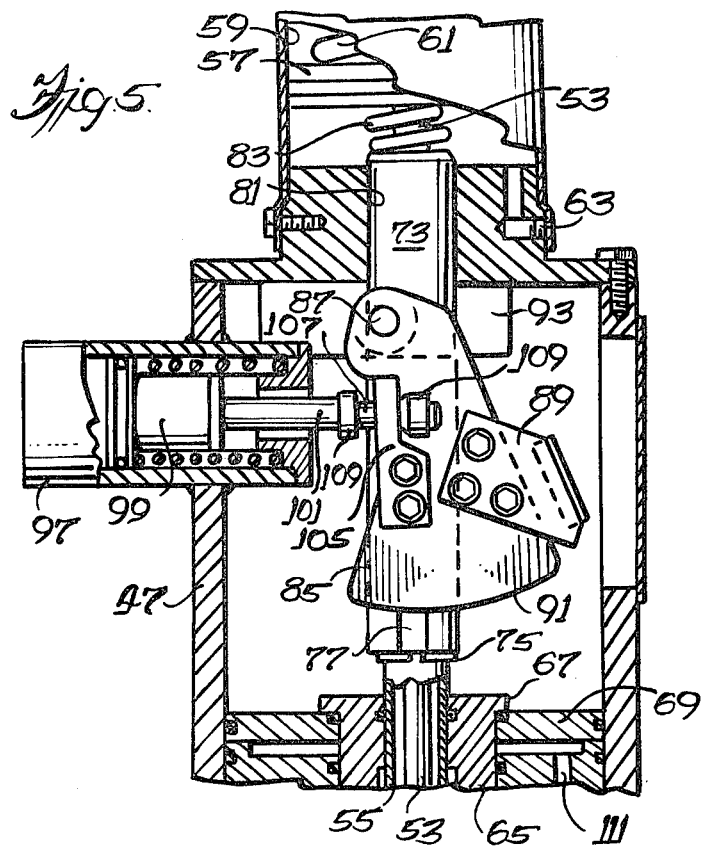
FIG. 5 is an enlarged sectional view taken through the actuator mechanism showing the mechanism as it would appear when the valve is in the position shown in FIG. 3 with only the lower valve member part lifted from its seat.

Illustrated in the drawings is a valve 11 having an actuator mechanism 13 surmounted thereon. The valve has a housing 15 which has a first lower conduit section 17 and a second upper conduit section 19. The lower conduit section 17 is designed for interconnection to a line of a first piping system, and the upper conduit section 19 is designed for connection to a line of a second piping system. An interconnecting region 21 provides communication between the region of the first conduit and the region of the second conduit so as to allow liquid flow between the two conduits when the valve is in the open position.

A composite valve member 23 is provided having a first lower part 25 and a second upper part 27 which are movable relative to each other and which define an intermediate chamber 29 therebetween. The interconnecting region 21 of the housing is formed with a pair of annular seats, a first lower seat 31 and a second upper seat 33. The lower valve member part 25 carries an annular sealing ring 35 which creates a seal when it is in abutting contact with the lower seat 31. The upper valve member part 27 carries a seal ring 37 which similarly creates a seal with the upper seat 33 when it is in abutting contact therewith. In addition, the upper seal ring 37 includes a depending seal ring portion which effects a seal about the periphery of the intermediate chamber 29 when the lower valve member part has been lifted into abutting contact with the upper 25.

This intermediate chamber 29 between the two parts has a central entrance passageway 39 through which cleaning solution can be introduced via a depending relatively small diameter tube 41. The intermediate chamber 29 is also in communication with a drain passageway system 43 which discharges into the annular region between the exterior of the entrance tube 41 and the interior surface of a larger diameter coaxial drain tube 45. The actuator mechanism 13 includes an outer housing 47 the lower end of which is connected to the upper end of the valve housing 15 by a suitable clamping ring 49 (FIG. 1). The upper portion of the acutator 13 includes some visual indicators and dual microswitch position indicators which form no part of the present invention and thus are not described in any detail.

The operable interconnection between the composite valve member 23 and the actuator mechanism 13 is provided by means of a rod member 53 and a coaxial surrounding tube member 55, both of which extend out of the upper end of the valve housing and into the actuator 13 where they are operatively connected. The rod member 53 is integrally connected to the lower valve member part 25, and the tube member 55 is integrally connected to the upper valve member part 27. The rod member 53 extends upward a substantial distance into the actuator housing 47 where it is connected to a surrounding piston head 57 which is slidably mounted in a cylinder 59 formed as a part of the actuator housing 47.

The piston head 57 is biased downward, as by an overlying compression spring 61. It is the force of this compression spring 61 which maintains the seal ring 35 of the lower valve member part in abutting, sealing contact with the lower seat 31. The entry of fluid, e.g., air, through a port 63 in the housing overcomes the force of the spring 61 and causes the cylinder to be stroked, lifting the lower valve member part from its seat.

The tube member 55 extends upward through a slidable sleeve or retainer 65 having an enlarged head portion 67 that rests upon a second piston head 69 that is slidably received in a lower portion of the housing 47 that serves as a second cylinder 71. An extension tube 73 is mounted at the upper end of the tube member 55 in a suitable manner. For example, the extension tube 73 may fit down over the upper end of the tube member 55 for a sufficient distance so that it is stably suuported on it in surrounding coaxial relationship. A split ring 75 is installed in a groove cut in the outer surface of the tube member 55 so the lower end of the extension tube rests upon and transmits force in a downward direction to the tube member 55, completing the joinder.

Figure 7:
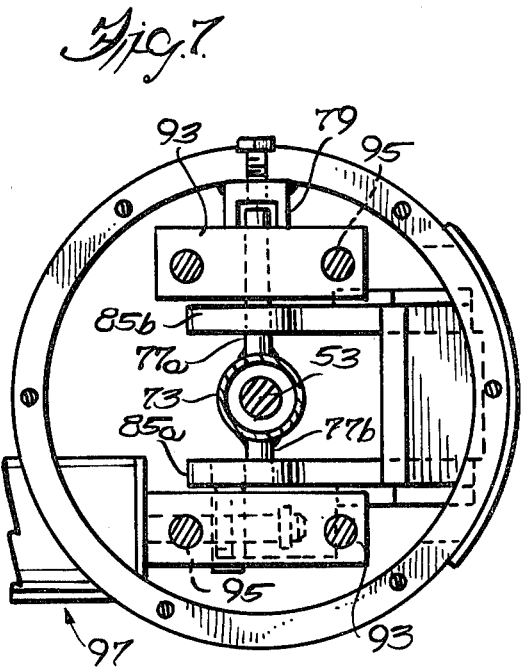
FIG. 7 is a sectional view looking downward taken generally along the line 7—7 of FIG. 6.

The extension tube 73 contains a pair of radially extending lugs 77 which extend horizontally outward and have a curved upper surface. As best seen in FIG. 7, the lug 77a is longer than the lug 77b and its end is received in a vertical slot in a guide 79 that is suitably affixed to the interior wall of the housing. The provision of the guide 79 assures that the extension tube 73 cannot rotate about its axis so that the lugs 77 will always be oriented in a predetermined direction. The upper end of the extension tube 73 passes slidably through a bearing surface 81 provided in an intermediate section of the housing, and it is biased downward by a compression spring 83 which bears against the undersurface of the upper piston head 57.

The lugs 77 cooperate with a pair of hold-down cams 85 individually shaped generally like a section of pie. The cams 85 are mounted so as to swing about pivot points in their upper end provided by a pair of pivot pins 87 and are rigidly interconnected with each other through a bracket 89 which is suitably affixed to each of the cams as by a set of three cap screws. The cams 85 each have a lower arcuate surface 91 which engages against the upper curved surface of the lugs 77 forcing the upper seal ring 37 firmly against the upper seat 33. The pivot pins 87 are suitably mounted as by a pair of generally rectangular mounting blocks 93 which are suitably mounted to the undersurface of this portion of the housing 47 as by a pair of cap screws 95 which extend upward through the blocks into tapped holes provided in the housing.

Figure 6:
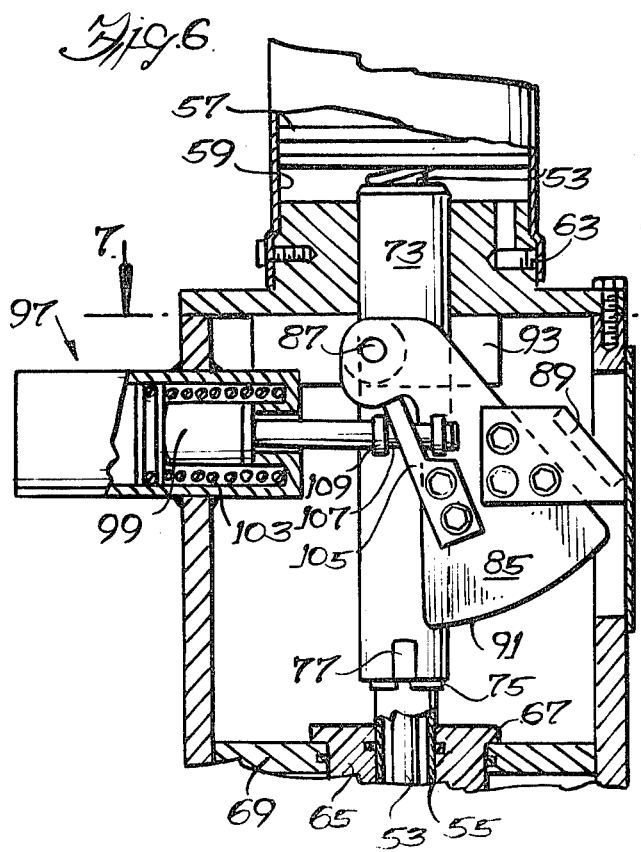
FIG. 6 is a view similar to FIG. 5 showing the hold-down cam means pivoted to the right to a non-interfering position.
Figure 8:
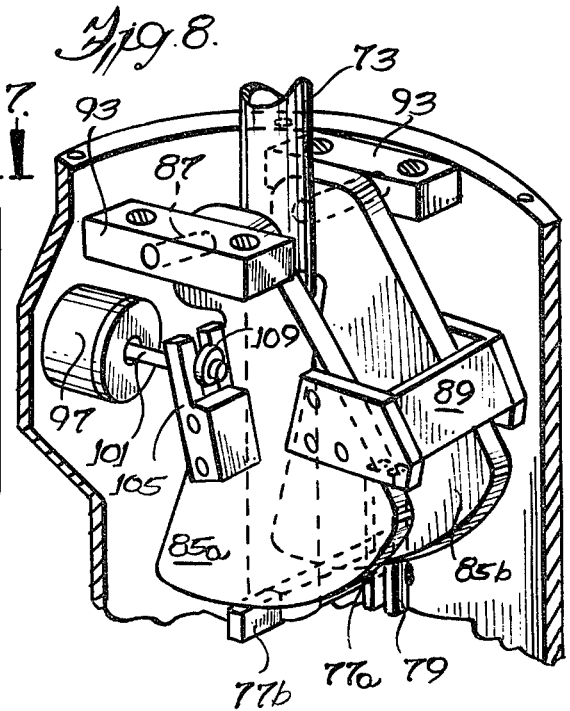
FIG. 8 is a perspective view of the mechanism in the position shown in FIG. 5, enlarged in size and with portions removed and broken away to illustrate the relationship between the cams and the lugs carried by the tube member.

The cam arrangement is moved between its blocking or latched position, as shown in FIG. 5, and a non-interfering or unlatched position shown in FIG. 6 by a small horizontally mounted fluid-actuated cylinder 97. The cylinder 97 has a piston head 99 and a piston rod 101 which extends through the right-hand end of the cylinder, as illustrated in FIGS. 5 and 6. The cylinder is appropriately affixed, as by welding, to the sidewall of the housing, residing in an appropriate hole of suitable diameter. A compression spring 103 biases the piston 99 toward the left, to the retracted position, as depicted in FIG. 5. The free end of the piston rod is mechanically connected to the hold-down cam arrangement in any suitable manner using a mechanical linkage which allows the horizontal reciprocating motion of the piston rod to effect pivotal swinging movement of the pie-shaped cams 85. Illustrated in the preferred embodiment is a link 105 which is bolted to the outer surface of the cam 85a and which has a forked or a bifurcated upper end that fits about a portion 107 of the piston rod of slightly reduced diameter. A pair of collars 109 are attached to the piston rod in flanking relation to this reduced diameter section 107 and effect the transfer of force between the piston 101 and the forked end of the link 105.

When air pressure is applied to the small horizontal cylinder 97, the piston and piston rod move to the extended position shown in FIG. 6 swinging the cams 85 to the right (counterclockwise) to the non-interfering or unlatched position. With the hold-down cams in this position, the valve 11 may be operated to place the lower and upper conduits in fluid communication with each other. This is carried out by supplying air to the port 63 to raise the main piston head 57 which is connected to the upper end of the rod member 53. The upward movement of the rod 53 lifts the lower valve member part 25 from its seat, and after a short distance of travel, it engages the undersurface of the upper valve member part 27 (as shown in FIG. 4), sealing the periphery of the intermediate chamber 29. Continued movement of the rod member 53 lifts the composite valve member 23 to the approximate location shown near the centerline of the upper conduit 19, thus allowing free flow of liquid through the interconnecting region 21.

When the hold-down cams 85 in the position as shown in FIG. 6, it is also possible to raise only the upper valve member part 27 for cleaning the upper seat. To accomplish this, fluid, e.g., air, is supplied through a port 111 into the region just below the lower piston head 69 causing it and the sleeve member 65 to move upward. When the upper surface of the sleeve member head portion 67 contacts the split ring 75 the tube member 55 begins to move upward, lifting the upper seal ring 37 from the upper seat 33. The distance which the upper part can be separately moved is determined by a stop ring 113 (FIG. 1) which is mounted on a depending threaded portion of the sleeve member 65 and which abuts the undersurface of the actuator housing 47 to establish the desired upper limit of its travel.

When fluid is released from the cam-driving, horizontal cylinder 97, the spring 103 forces the piston and piston rod to the left so that the collar 109 at the end of the piston rod pulls against the forked end of the link 105 that is bolted to the cam, causing pivoting in a clockwise direction. The arcuate camming surface 91 of the cam 85 is cut so as to begin to freely slide along the arcuate upper surfaces of the lugs 77 and then press them downward as it continues its pivotal movement to the position shown in FIG. 5. The force applied to the lugs 77 pushes the extension tube 73 downward against the split ring 75 which is affixed to the upper end of the tube member 55, assuring that the upper seal ring 37 will thereafter remain firmly in contact with the upper seat 33 within the valve 11.

In this locked or latched position, the lower valve member part 25 can be lifted upward from its lower seat 31 by applying pressure to the upper lifting cylinder through the port 63. However, the mechanical locking of the cams against the lugs positively assures that neither overtravel of the lower valve member part 25 or the occurrence of a hydraulic surge or spike in the cleaning solution flowing through the lower line 17 will inadvertently open the upper valve. In order to carry out the cleaning of the lower seat 31 surface, the lower valve member part 25 is cycled up-and-down. Each time it lifts off the seat 31, a pulse of cleaning solution rushes past the seat and flows into the drain tube 45 before the lower part abuts the upper part 27 and closes the peripheral entrance to the intermediate chamber 29.

When the upper seat 33 is being cleaned with the upper valve member part 27 raised, there is no danger of inadvertent opening of the lower valve member part 25 because overpressure in the interconnecting region would only serve to force the lower part downward into a more tightly closed position. The use of the spring-biased horizontal cylinder 97 to pull the cam arrangement into the locking position provides a fail-safe arrangement; even if a loss of air pressure were to occur, the valve members would go to the closed position and the cams 85 would lock the upper valve member part 27 against the upper seat 33 until control air pressure was re-established. One further advantage of the overall arrangement is that the upper piston 57 and cylinder 59 can be formed as a double-acting fluid-actuated cylinder so that, in addition to using the mechanical biasing effect of the spring 61 to hold the piston head 57, the rod member 53 and lower valve member part 25 in the maximum downward position, boost air can be added to an upper port (not shown) in the actuator housing 47 which would assist the main spring 61. The use of boost air can also be used in cleaning the lower seat 31 to increase the length of the pulses of cleaning solution flow by slowing the upward rate of travel of the lower valve member part 25.

Although the invention has been described in order to set forth details of the preferred embodiment which constitutes the best mode presently known to the inventor for carrying out the invention, it should be understood that various changes and modifications as would be obvious to one having the ordinary skill in this art might be made without deviating from the scope of the invention which is defined solely by the claims appended hereto.

Particular features of the invention are emphasized in the claims which follow.

What is claimed is:

1. In a valve for allowing the separate flow of liquids through two lines of two separate piping systems without intermixing when the valve is in the closed position and for permitting flow between the two lines when the valve is in the open position, which valve includes a housing which has a first conduit region for connection to a line of the first piping system, a second conduit region for connection to a line of the second piping system and an interconnecting region located between said first and second conduit regions which has first and second valve seats provided therein, a composite valve member having upper and lower parts disposed within said interconnecting region of said housing, a rod member extending upward from said lower part and through the upper end of said housing, a hollow tube member coaxial with said rod member that extends upward from said upper valve member part through the upper end of said housing, said upper and lower valve member parts being relatively movable and being proportioned to seal against said first and second valve seats, said composite valve member having a passageway extending from an exterior location to an intermediate chamber which is defined between said relatively movable valve member parts, said upper and lower valve parts being vertically spaced apart from each other so that the periphery of said chamber is open when both are in contact with said respective valve seats and being movable into abutting contact with each other to close the periphery of said intermediate chamber therebetween when said lower valve member part is lifted a sufficient vertical distance to also lift said upper valve member part from its seat and thereby open communication between said two piping systems, actuator means disposed exterior of said housing for individually lifting either of said valve member parts and including first means for lifting said rod member connected to said lower valve member part and second means for lifting said tube member connected to said upper part, the improvement which comprises mechanical means for normally and positively blocking the upward movement of said tube member so as to prevent the lifting of said upper part from its seat and means for moving said blocking means from its normal blocking location whenever it is desired to individually lift said upper part or to lift both said lower and upper valve member parts, whereby said upper part is positively seated upon its valve seat and blocked against movement through said mechanical means when only said lower part is lifted and cleaning-in-place of said respective valve seat of the lower part is taking place by the flow of cleaning solution therepast.

2. The invention in accordance with claim 1 wherein said blocking means is spring-biased to the blocking position and fluid-actuated cylinder means is provided for moving said blocking means from its normal blocking location to a non-interfering location.

3. The invention in accordance with claim 1 wherein said blocking means includes hold-down cam means which is pivotally mounted to swing between said normal blocking location and a non-interfering location.

4. The invention in accordance with claim 3 wherein said hold-down cam means is pivoted near its upper end and has a curved lower surface which engages lug means carried by said tube member.

5. The invention in accordance with claim 4 wherein said actuator has an outer housing which is interconnected with said valve housing and wherein vertically slotted guide means is affixed to an inner vertical wall of said actuator housing, said lug means extending generally horizontally from said tube member and a free end of said lug means being slidably received in said vertical slot of said guide means.

6. The invention in accordance with claim 5 wherein said cam means includes a pair of cams which are mounted to pivot in parallel vertical planes and which are rigidly interconnected to each other by bracket means.

7. The invention in accordance with claim 6 wherein said rod member extends upward past said hold-down cam means to an upper location where it is joined to a piston of a fluid-actuated cylinder which is included in said first lifting means.

8. The invention in accordance with claim 7 wherein said tube member extends vertically upward past the vertical level of said lug means and is spring-biased downwardly by coil spring means abutting against the underside of said piston.

9. The invention in accordance with claim 8 wherein said second lifting means includes abutment means affixed to said tube member at a location below the upper surface of said lug means and sleeve means slidably mounted on said tube member for engagement with the underside of said abutment means.

10. The invention in accordance with claim 9 wherein said slidable sleeve means constitutes a portion of a second piston which is mounted in an internal cylindrical portion of said actuator housing and which forms a part of said second lifting means.

11. The invention in accordance with claim 10 wherein said slidable sleeve means extends downward and exterior of said actuator housing and carries adjustable stop means for engagement against the underside of said actuator housing to limit the length of stroke of said second lifting means and thereby limit the distance said upper valve member part can be lifted from its valve seat when only it is being lifted.

12. A valve for allowing the separate flow of liquids through two lines of two separate piping systems without intermixing when the valve is in the closed position and for permitting flow between the two lines when the valve is in the open position, which valve includes a housing which has a first conduit region for connection to a line of the first piping system, a second conduit region for connection to a line of the second piping system and an interconnecting region located between said first and second conduit regions which has upper and lower valve seats provided therein, a composite valve member having upper and lower parts disposed within said interconnecting region of said housing, a rod member extending upward from said lower part and through the upper end of said housing, a hollow tube member coaxial with said rod member that extends upward from said upper valve member part through the upper end of said housing, said upper and lower valve member parts being relatively movable and being proportioned to seal against said upper and lower valve seats, said composite valve member having a passageway extending from an exterior location to an intermediate chamber which is defined between said relatively movable valve member parts, said upper and lower valve parts being vertically spaced apart from each other so that the periphery of said chamber is open when both are in contact with said respective valve seats and being movable into abutting contact with each other to close the periphery of said intermediate chamber therebetween when said lower valve member part is lifted a sufficient vertical distance to also lift said upper valve member part from its seat and thereby open communication between said two piping systems, actuator means disposed exterior of said housing for individually lifting either of said valve member parts and including first means for lifting said rod member connected to said lower valve member part and second means for lifting said tube member connected to said upper part, radially extending lug means carried by said tube member, hold-down cam means having a curved lower surface which is pivotally mounted to swing between a normal blocking location for normally blocking the upward movement of said tube member so as to prevent the lifting of said upper part from its seat and a non-interfering location, and means for swinging said cam means from its normal blocking location whenever it is desired to individually lift said upper part or to lift both said lower and upper valve member parts, whereby said upper part is positively seated upon its valve seat and blocked against movement through said cam means when only said lower part is lifted for cleaning-in-place of said lower valve seat.

13. The valve in accordance with claim 12 wherein said cam means is spring-biased to the blocking position and fluid-actuated cylinder means is provided for moving said blocking means from its normal blocking location to a non-interfering location.

* * * * *